United States Patent [19]

Lalancette

[11] 3,880,944

[45] Apr. 29, 1975

[54] FRIEDEL-CRAFTS REACTION WITH GRAPHITE INTERCALATED LEWIS ACIDS

[75] Inventor: Jean-Marc Lalancette, Sherbrooke, Quebec, Canada

[73] Assignee: Ventron Corporation, Beverly, Mass.

[22] Filed: Nov. 13, 1973

[21] Appl. No.: 415,391

[52] U.S. Cl. ...... 260/671 C; 260/671 R; 260/671 P
[51] Int. Cl. ............................................. C07c 3/56
[58] Field of Search......... 260/671 R, 671 C, 671 P; 252/441

[56] References Cited
UNITED STATES PATENTS 2,919,266  12/1959  Lauer................................. 252/441
3,240,827  3/1966   Lainé et al......................... 252/441
3,785,999  1/1974   Derleth et al...................... 252/441

Primary Examiner—C. Davis
Attorney, Agent, or Firm—Cushman, Darby & Cushman

[57] ABSTRACT

Improved synthesis of hydrocarbons of mixed type by the Friedel-Crafts hydrocarbon synthesis is obtained by using a graphite intercalated Lewis acid selected from aluminum trichloride, aluminum tribromide and ferric chloride whereby a greater proportion of mono- and disubstituted hydrocarbon is obtained than using the Lewis acid alone.

6 Claims, No Drawings

FRIEDEL-CRAFTS REACTION WITH GRAPHITE INTERCALATED LEWIS ACIDS

The invention relates to an improvement in the synthesis of hydrocarbons of mixed type by the Friedel-Crafts hydrocarbon synthesis.

BACKGROUND OF THE INVENTION

The Friedel-Crafts reaction for the synthesis of ketones or mixed hydrocarbons by the reaction of hydrocarbons with acyl chlorides or anhydrides or with alkyl halides in the presence of a Lewis acid, especially anhydrous aluminum halides such as the chloride is well known. Normally such reaction are used to react unsaturated aliphatic hydrocarbons or halogenated aliphatic hydrocarbons with aromatic or aliphatic unsaturated hydrocarbons. The preferred Lewis acid used as a catalyst is aluminum trichloride or tribromide.

A disadvantage of the Friedel-Crafts hydrocarbon synthesis is that the reaction does not stop at the stage of the monosubstitution but proceeds to the formation of polysubstitution products because the monosubstituted hydrocarbon initially formed will undergo further reaction more readily than the starting hydrocarbon, thus yielding an important amount of di, tri and tetra substituted products in the reaction mixture.

A further disadvantage of the Friedel-Crafts hydrocarbon synthesis as carried out heretofore is that the Lewis acids used as catalyst in the reaction are very hygroscopic thus requiring special handling precautions because hydrolysis will occur readily even in the presence of moist air.

Another disadvantage of the Friedel-Crafts reaction is that once the reactants are placed together in the reaction vessel, there is no possible control of the reaction in the sense that the reaction cannot be stopped at any particular level of reaction so that eventually the ultimate degree of possible substitution is reached.

Accordingly, any process which will overcome the prior art disadvantages by permitting a control of the reaction, thus a control of the degree of substitution, while circumventing the necessity of handling the starting materials under strict anhydrous conditions will provide a much desired improvement over the prior art procedures.

THE INVENTION

In accordance with the present invention, there is now provided an improvement in the Friedel-Craft reaction which comprises carrying out the reaction in the presence of a Lewis acid selected from aluminum trichloride, aluminum tribromide and ferric chloride, intercalated in the lattices of graphite, whereby the importance of polysubstitution is decreased thereby yielding a mixture of predominantly mono and disubstituted hydrocarbons rather than the more highly substituted mixtures obtained by the standard Friedel-Crafts catalyst.

The intercalation of metal and metal salts in the lattice of graphite has been described in the literature and most authors appear to have been concerned with the study of the crystal structure of intercalated graphite metal and metal salts or the possible reaction between graphite and metal or metal salts (see for example Advances in Inorganic Chemistry and Radiochemistry, Rudorff, I, 224–265, 1959). However the chemistry of intercalated salts has received very little attention.

There are many reasons which would lead one to believe that intercalated Lewis acids in graphite would not be suitable as catalysts for Friedel-Crafts reactions. First due to its intercalation the Lewis acid would not be as readily available to the reactants as it is in the usual Friedel-Crafts reaction where the Lewis acid is mixed directly with the reactants.

Furthermore it is known that in a Friedel-Crafts reaction an intermediate complex aluminum compound must be formed before the desired substituted hydrocarbon is obtained. The mechanism of the formation of the complex may be illustrated as follows:

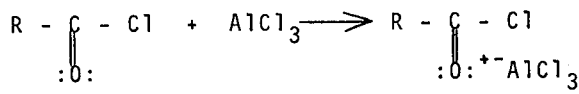

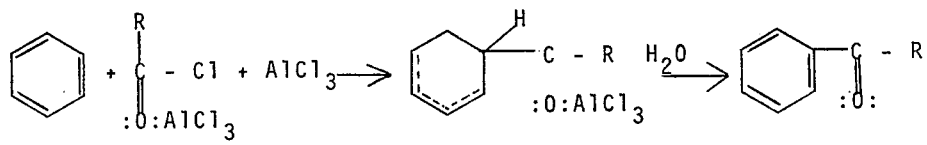

In a straight alkylation the intermediate complex is formed as follows:

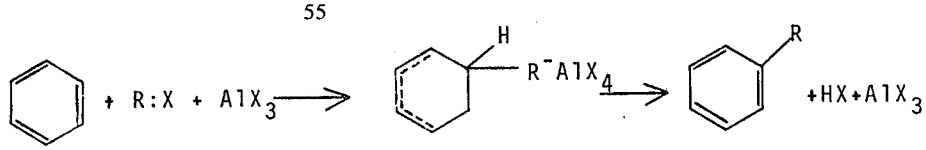

In view of the structure of the reactant to the Lewis acid when it is intercalated in graphite, one would be led to believe that the essential complex would not be formed, and thus such intercalated Lewis acids in graphite would present the disadvantage of decreased reactivity.

Also the "Lewis acids" character of substances such as aluminum chloride or ferric chloride has always been believed to be an essential feature of a Friedel-Crafts reaction. However, some of the Lewis acids such as ferric chloride when imbedded in the electron-rich graphite become very resistant to hydrolysis because water can less readily reach the iron partly neutralized by the graphite electrons. Thus it would be normal to believe that a catalyst which would be intercalated would be completely inert.

Accordingly, because of the structure of intercalated Lewis acids in graphite, and because of the non-hygroscopicity or reduced hygroscopicity of the Lewis acid in such a structure, one would be led to believe that the essential intermediate required in Friedel-Crafts reactions would not be formed or the intercalated Lewis acid in graphite would be non-reactive.

Surprisingly, it has been found that a Lewis acid intercalated in graphite is in many aspects unexpectedly superior in a Friedel-Crafts reaction to the Lewis acid as used previously.

The fact that intercalated Lewis acids in graphite are less hydroscopic, the carrying out of the reaction requires less precautions. It has also been observed that the reaction is slower thus allowing a better control of the reaction as opposed to the prior art procedure with the result that an unexpectedly higher proportion of mono and disubstituted hydrocarbon is obtained.

Since the improved process of the present invention provide higher yields of less substituted hydrocarbons, it can readily be appreciated that a great advantage is thus provided in industrial synthesis by providing less of the highly substituted fractions whereby expensive separation procedures are avoided or reduced, and the consumption of the starting materials for production of undesired side products is reduced.

A possible explanation of the surprising absence of polysubstitution is that once the monosubstituted hydrocarbon has been formed and because it no longer has a planary structure and is much bulkier, it has more difficulty in diffusing through the intercalated graphite and thus is less available for further reaction to form a disubstituted compound, and any disubstituted compound formed will itself have for the same reasons more difficulty in diffusing through the intercalated graphite catalyst thus allowing for less formation of tri-substituted graphite.

The Lewis acid which can be intercalated in graphite are aluminum trichloride, aluminum tribromide, and ferric chloride, with aluminum trichloride being preferred because of its low price and appropriate reactivity. The amount of catalyst which can be intercalated can be as low as 0.1% to the saturation point which is about 35% by weight of the graphite in most cases.

The preparation of the catalyst used in accordance with the present invention will now be described.

The procedure is similar to that described in Rudorff in Z. Anorg. Chem. 279 182 (1955). In this procedure graphite and the metal chloride to be intercalated are introduced in an atmosphere of helium in an aluminum autoclave. The system is then flushed with chlorine and after a suitable pressure has built in the system, it is closed and the autoclave is heated at 260°C. for 24 hours. The non-intercalated metal chloride is removed by breaking the solid mass in a dry atmosphere and heating under vacuum at about 250°C.

In the synthesis of substituted hydrocarbons an aromatic hydrocarbon is reacted with an aliphatic hydrocarbon or a halogenated aliphatic hydrocarbon.

As an example of aromatic or aliphatic hydrocarbons there may be mentioned benzene, toluene, naphthalene, biphenyl, xylenes and the like. As an example of unsaturated hydrocarbons there may be mentioned ethylene, propylene, butylenes, including isobutylene, pentenes, heptenes, octenes, decenes, dodecenes and octadecenes, and the like. As an example of halogenated hydrocarbon there may be mentioned ethyl bromide, propyl bromide, butylbromide, ethyl chloride, pentyl bromide.

The synthesis of the substituted hydrocarbons may be carried out in accordance with the present invention under temperature and pressure conditions normally used for alkylation. Nevertheless, an increase control of the reaction product is observed by using the intercalated catalyst provided for in the present process.

In order to fully understand the process of the present invention reference will now be made to the following examples.

EXAMPLE 1

Preparation of $AlCl_3$-graphite

The method used was in accordance with the description of Rudorff. A mixture of 20 g of graphite and 40 g of $AlCl_3$ (Fisher, Reagent) was introduced, in an atmosphere of helium, into an aluminium autoclave. The system was flushed with chlorine and a pressure of 40 psi of chlorine was built in the system. The inlet and outlet were then closed and the autoclave heated at 260° for 24 hrs. Upon heating, the pressure reached 250 psi. After cooling, the autoclave was opened. Some $AlCl_3$ was condensed on top of the autoclave. The solid mass was broken in a dry atmosphere and heated for 16 hrs. under vacuum, at 250°. This treatment removed the non-intercalated $AlCl_3$. By standard analytical procedure, this material contained 6.0% Al and 24.0% Cl. The experiment could be easily reproduced and gave a concentration of $AlCl_3$ in the graphite in the range of 30–35%.

By proceeding in the same manner, and substituting aluminum tribromide for aluminum trichloride there is obtained an aluminum tribromide-graphite catalyst. By substituting ferric chloride for aluminum trichloride there is obtained the corresponding ferric chloride-graphite catalyst.

EXAMPLES 2–7

In Table I there are reported the results obtained by reacting a hydrocarbon with a halogenated hydrocarbon or a unsaturated hydrocarbon under normal temperature and pressure using the $AlCl_3$-graphite catalyst obtained in Example 1. Each experiment was repeated using ordinary aluminum chloride as catalyst.

System of sealed tube reaction

In a thick wall test tube (1.5 × 12.5 cm) $AlCl_3$-graphite was introduced with the substrate (S) and the reagent (R). The mixture was frozen in dry ice and the tube sealed under vacuum. After a contact of 44 hours at room temperature, the tube was opened and the reaction mixture was extracted with ether. Using the same amount of substrate, reagent and aluminum chloride without intercalation the experiment was repeated. The extracted mixtures were then analyzed by vapor phase chromatography, the fractions being identified by mass spectrometry.

TABLE I

Reaction with AlCl₃-graphite

| System | | Substrate S | Reagent R | Temperature °C | Duration hrs | Molar ratio R/S | | Analysis of Products obtained in reaction mixture with AlCl₃ | with AlCl₃-graphite |
|---|---|---|---|---|---|---|---|---|---|
| 2 | Sealed tube | Benzene | ethyl bromide | 25 | 48 | 3 | benzene<br>monoethyl-<br>diethyl-<br>triethyl-<br>tetraethyl- | 2<br>13<br>27<br>54<br>4 | 29<br>40<br>23<br>8<br>traces |
| 3 | Sealed tube | Toluene | ethyl bromide | 25 | 24 | 3 | toluene<br>monoethyl-<br>diethyl-<br>triethyl- | 0<br>traces<br>41<br>60 | 17<br>52<br>31<br>traces |
| 4 | Atmospheric | Toluene | ethyl bromide | −10 | 24 | 2 | toluene<br>monoethyl-<br>diethyl-<br>triethyl- | 5<br>traces<br>30<br>65 | 5<br>33<br>52<br>10 |
| 5 | Sealed tube | Naphthalene | ethyl bromide | 25 | 44 | 3 | naphtalene<br>monoethyl-<br>diethyl-tetrahydro<br>diethyl-<br>triethyl | 26<br>39<br>2<br>17<br>16 | 77<br>21<br><br>traces<br>1<br>0.5 |
| 6 | Sealed tube | Biphenyl | ethyl bromide | 25 | 48 | 3 | biphenyl<br>diethyl-<br>tetra-hexa ethyl-<br>octaethyl- | 26<br>16<br>33<br>25 | 81<br>15<br>4<br>0 |
| 7 | Atmospheric | Benzene | ethylene | 75 | 24 | — | benzene<br>monoethyl-<br>diethyl-<br>triethyl-<br>tetraethyl-<br>pentaethyl-<br>hexaethyl- | 0<br>traces<br>1.1<br>25<br>53<br>18<br>4 | 3<br>19<br>47<br>22<br>6<br>2<br>1 |

It will be noted that in all Examples the amount of trisubstitution and higher substituted hydrocarbons is unexpectedly reduced when using aluminum chloride intercalated in graphite as catalyst. In most cases the amount of monosubstituted hydrocarbon is unexpectedly increased, while the amount of disubstituted hydrocarbon is also reduced.

EXAMPLES 8-11

Reaction at elevated temperatures

Table II shows examples wherein the substrate (S) and reagent (R) are brought together in the presence of aluminum chloride intercalated in graphite at temperatures between 60° to 80°C. After cooling, the organic phase is washed with bicarbonate and analyzed by preparative vapor phase chromatography. The same experiments were repeated with non intercalated aluminum chloride as catalyst, and results are compared in Table II.

In these Examples it will be noted that in most cases there is little formation of trisubstituted hydrocarbons with greater recovery of monosubstituted hydrocarbons.

TABLE II

FRIEDEL-CRAFT REACTION

| | System | Substrate S | Reagent R | Temperature °C | Duration hrs | | Product *** With AlCl₃ % | With AlCl₃/C₆ % | |
|---|---|---|---|---|---|---|---|---|---|
| 8 | Atm. | Benzene | Propylene | 60 | 0.5 | Benzene<br>monoisopropyl<br>diisopropyl<br>triisopropyl | 23<br>56<br>18<br>3 | 44<br>54<br>2<br>traces | * |
| 9 | Atm. | Toluene | Ethylene | 80 | 1.45 | Toluene<br>monoethyl<br>diethyl | 8<br>49<br>40 | 17<br>51<br>26 | * |
| 10 | Atm. | Toluene | Propylene | 80 | 2.50 | Toluene<br>monoisopropyl<br>diisopropyl<br>triisopropyl | traces<br>traces<br>42<br>46 | 4<br>33<br>59<br>traces | * |
| 11 | Atm. | Toluene | Isobutylene | 80 | 1.15 | Toluene<br>monoisobutyl<br>diisobutyl | 20<br>66<br>13 | 35<br>63<br>1 | ** |

\* 43.5% AlCl₃ in graphite.
\*\* 27.0% AlCl₃ in graphite.
\*\*\* Some minor components of the reaction mixtures have not been identified.

EXAMPLE 12

By proceeding as in Example 1 and using 10 g of AlBr$_3$ instead of aluminum trichloride and 90 g of graphite there is obtained a 10% aluminum tribromide-graphite intercalate.

To a mixture of 0.1 mole of toluene and 0.3 mole of ethyl bromide was added 3.0 g of aluminum tribromide. Under identical conditions a similar mixture of toluene and ethyl bromide was treated with 30 g of 10% AlBr$_3$-graphite intercalate. After a contact of 24 hours at room temperature and atmospheric pressure, the two mixtures were filtered, washed with a 3% sodium bicarbonate solution, dried and analyzed by vapor phase chromatography, the fractions being identified by mass spectrometry. The results obtained are as follows:

|  | AlBr$_3$ alone | AlBr$_3$-graphite intercalated |
|---|---|---|
| Toluene | 2% | 25% |
| Monoethyltoluene | 6% | 38% |
| Diethyltoluene | 30% | 25% |
| Triethyltoluene | 62% | 12% |

We claim:

1. In a process for the synthesis of substituted aromatic hydrocarbon by the reaction of an unsaturated aliphatic hydrocarbon or a halogenated aliphatic hydrocarbon with an aromatic hydrocarbon, the improvement which comprises carrying out the reaction in the presence of a graphite intercalated Lewis acid selected from the group consisting of aluminum chloride, aluminum tribromide and ferric chloride thereby to yield a reaction mixture containing a higher percentage of mono and disubstituted aromatic hydrocarbon than is obtained when using the Lewis acid alone.

2. The process of claim 1, wherein the reaction is carried out in the presence of aluminum trichloride intercalated in graphite, the amount of aluminum trichloride being up to about 35% by weight of graphite.

3. The process of claim 1, wherein the reaction is carried out in the presence of aluminum tribromide intercalated in graphite, the amount of aluminum tribromide being up to about 35% by weight of graphite.

4. The process of claim 1 wherein the aromatic hydrocarbon is reacted with an alkene having two to 18 carbon atoms or an alkyl halide having two to five carbon atoms and wherein the halogen is chlorine or bromine.

5. The process of claim 4, wherein the aromatic hydrocarbon is benzene, toluene, xylene, naphthalene or biphenyl.

6. The process of claim 5 wherein the alkene is ethylene, propylene or isobutylene and the alkyl halide is ethyl bromide.

* * * * *